United States Patent [19]

Wheeler et al.

[11] Patent Number: 4,848,779
[45] Date of Patent: Jul. 18, 1989

[54] KEYLESS CHUCK

[75] Inventors: Dale K. Wheeler, Hartford, Md.; Charles W. Coleman, Adams, Pa.

[73] Assignee: Black & Decker Inc., Newark, Del.

[21] Appl. No.: 33,328

[22] Filed: Apr. 2, 1987

[51] Int. Cl.⁴ .......................................... B23B 31/04
[52] U.S. Cl. ................................... 279/60; 279/1 K; 279/65
[58] Field of Search ................... 279/1 K, 1 B, 60–65

[56] References Cited

U.S. PATENT DOCUMENTS

| | | | |
|---|---|---|---|
| 2,406,444 | 8/1946 | Stoner | 279/48 |
| 2,683,041 | 7/1954 | Haviland | 279/39 |
| 3,350,108 | 10/1967 | Troka | 279/58 |
| 3,506,277 | 4/1970 | Harms | 279/1 |
| 3,545,776 | 12/1970 | Haviland | 279/63 |
| 3,599,999 | 8/1971 | Schnizler et al. | 279/60 |
| 3,712,633 | 1/1973 | Schadlich | 279/58 |
| 4,103,914 | 8/1978 | Rohm | 279/4 R |
| 4,213,623 | 7/1980 | Rohm | 279/1 C |
| 4,305,597 | 12/1981 | McCarty | 279/22 |
| 4,317,578 | 3/1982 | Welch | 279/60 |
| 4,498,682 | 2/1985 | Glore | 279/61 |
| 4,526,497 | 7/1985 | Hatfield | 279/1 K |
| 4,527,809 | 7/1985 | Umbert | 279/65 |
| 4,536,113 | 8/1985 | Hatfield | 279/1 K |
| 4,592,560 | 6/1986 | Neumaier et al. | 279/81 |
| 4,609,199 | 9/1986 | Rohm | 279/1 B |
| 4,648,608 | 3/1987 | Smith | 279/60 |
| 4,695,065 | 9/1987 | Komatsu et al. | 279/60 |

FOREIGN PATENT DOCUMENTS

| | | |
|---|---|---|
| 2639214 | 3/1978 | Fed. Rep. of Germany ........ 279/60 |
| 3424679 | 2/1986 | Fed. Rep. of Germany . |
| 3541964 | 6/1987 | Fed. Rep. of Germany . |
| 919639 | 3/1947 | France . |
| 1023518 | 3/1953 | France . |
| 115978 | 5/1918 | United Kingdom . |
| 191959 | 9/1922 | United Kingdom . |
| 1566855 | 5/1980 | United Kingdom . |
| 2158376 | 11/1985 | United Kingdom . |

OTHER PUBLICATIONS

National/Panasonic pamphlet Re: Keyless Drill Chuck; Model No. EZ991.

Primary Examiner—Steven C. Bishop
Attorney, Agent, or Firm—J. Bruce Hoofnagle; Harold Weinstein; Edward D. Murphy

[57] ABSTRACT

A keyless chuck includes a jaw housing with jaws that are advanced in respective guideways to grip a tool bit and retracted to loosen the grip on the tool bit. A jaw thrust member is coupled to the jaws and to a threaded spindle and is forced forwardly or rearwardly to advance or retract the jaws. The threaded chuck spindle engages the jaw thrust member through a small-area contact patch to limit the operating friction and thus provide a chuck which can be readily hand-tightened and which self-tightens in response to torque transmitted through the chuck. A lock mechanism is provided to selectively lock a chuck adjusting sleeve relative to the jaw housing to allow uni-directional movement of the chuck adjusting sleeve relative to the jaw housing or selective bi-directional locking of the chuck adjusting sleeve relative to the jaw housing. The lock mechanism includes a lock plate coupled to a chuck adjusting sleeve and includes a set of teeth on an axial face for engagement with complementary teeth on an axial face of the chuck adjusting nut. The lock plate is normally spring-biased into engagement with the chuck adjusting nut and can be disengaged from the chuck adjusting nut to temporarily disable the locking mechanism. The keyless chuck is assembled in such a way that the run-out of the finished chuck is minimal.

33 Claims, 12 Drawing Sheets

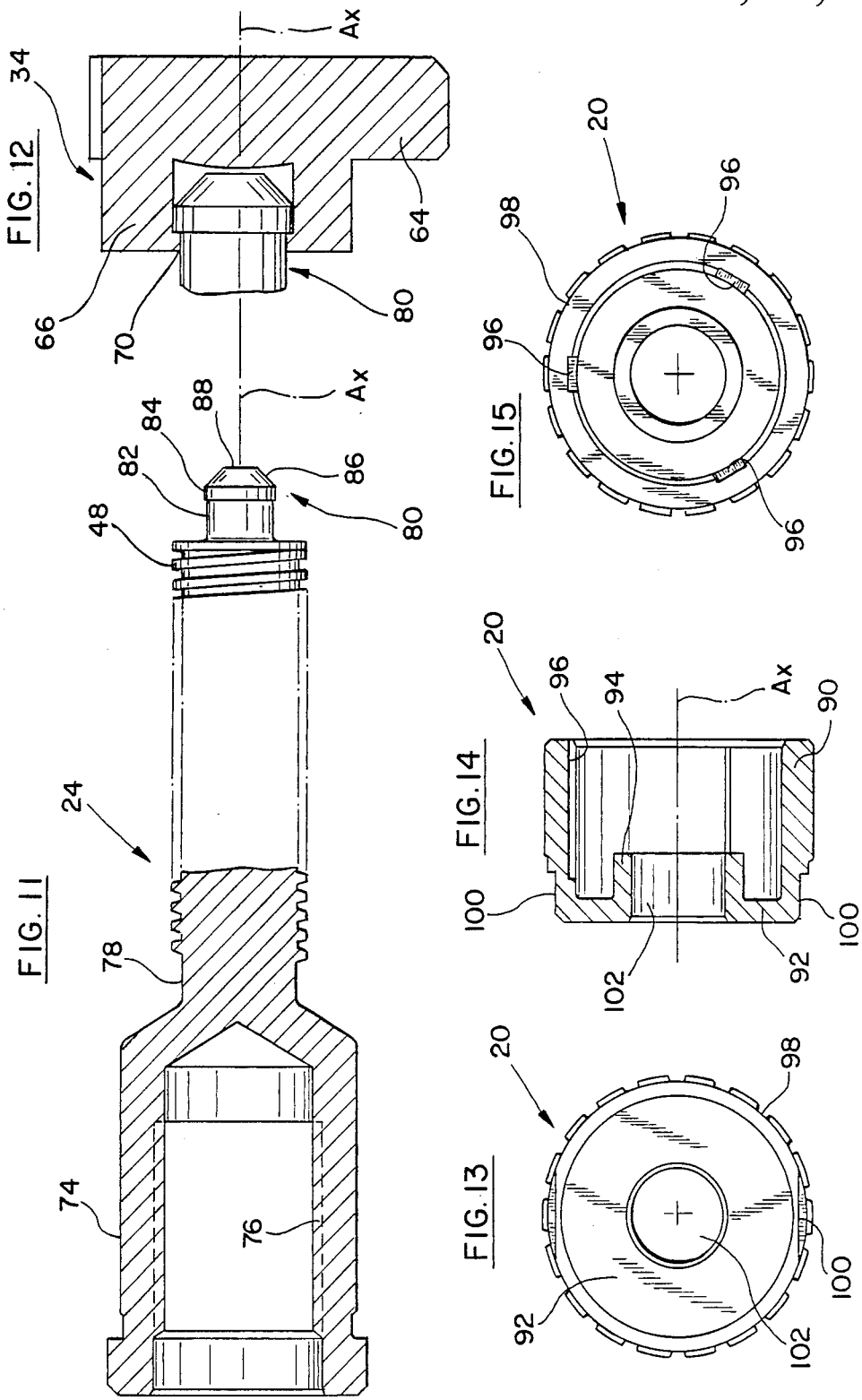

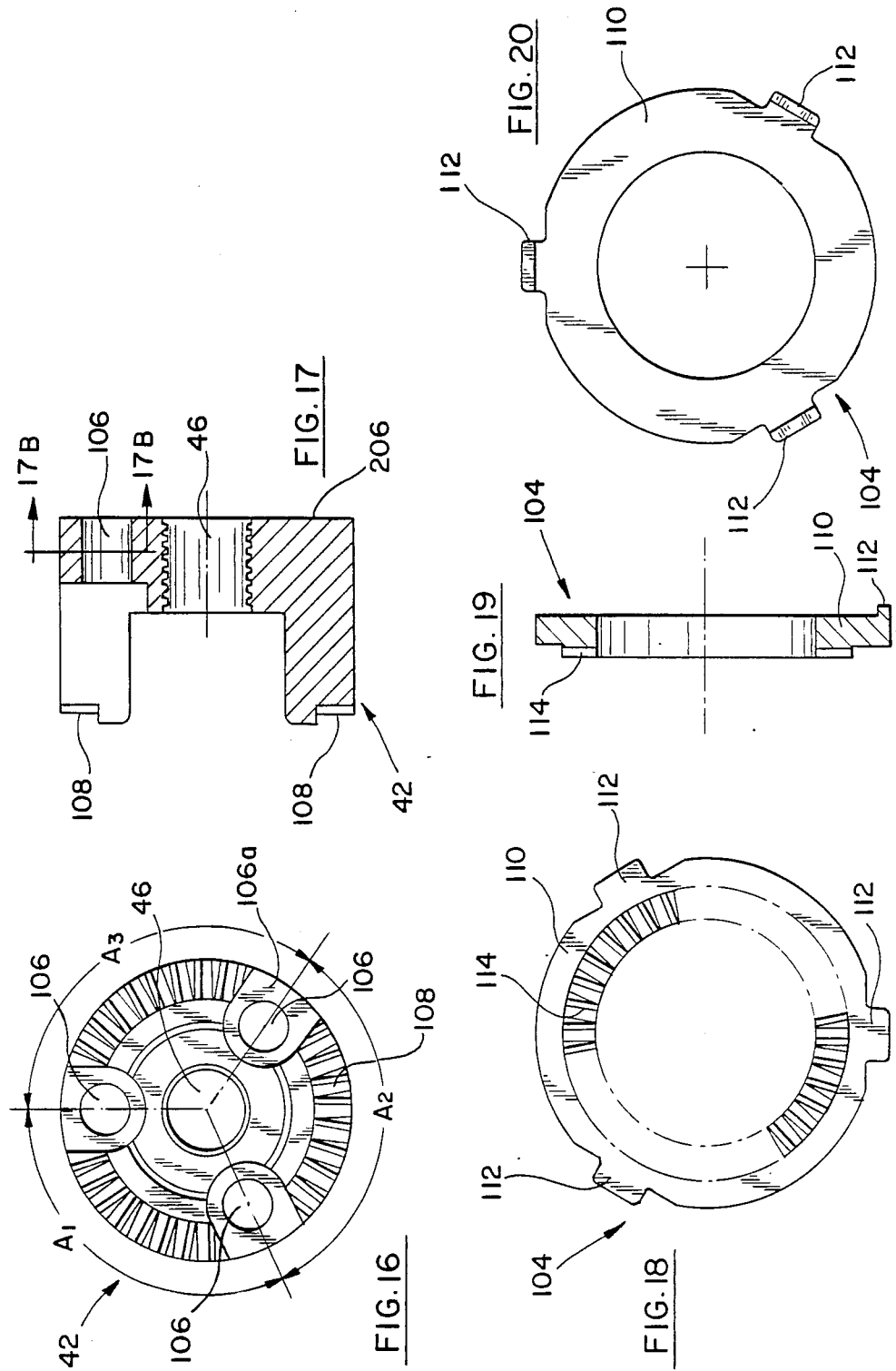

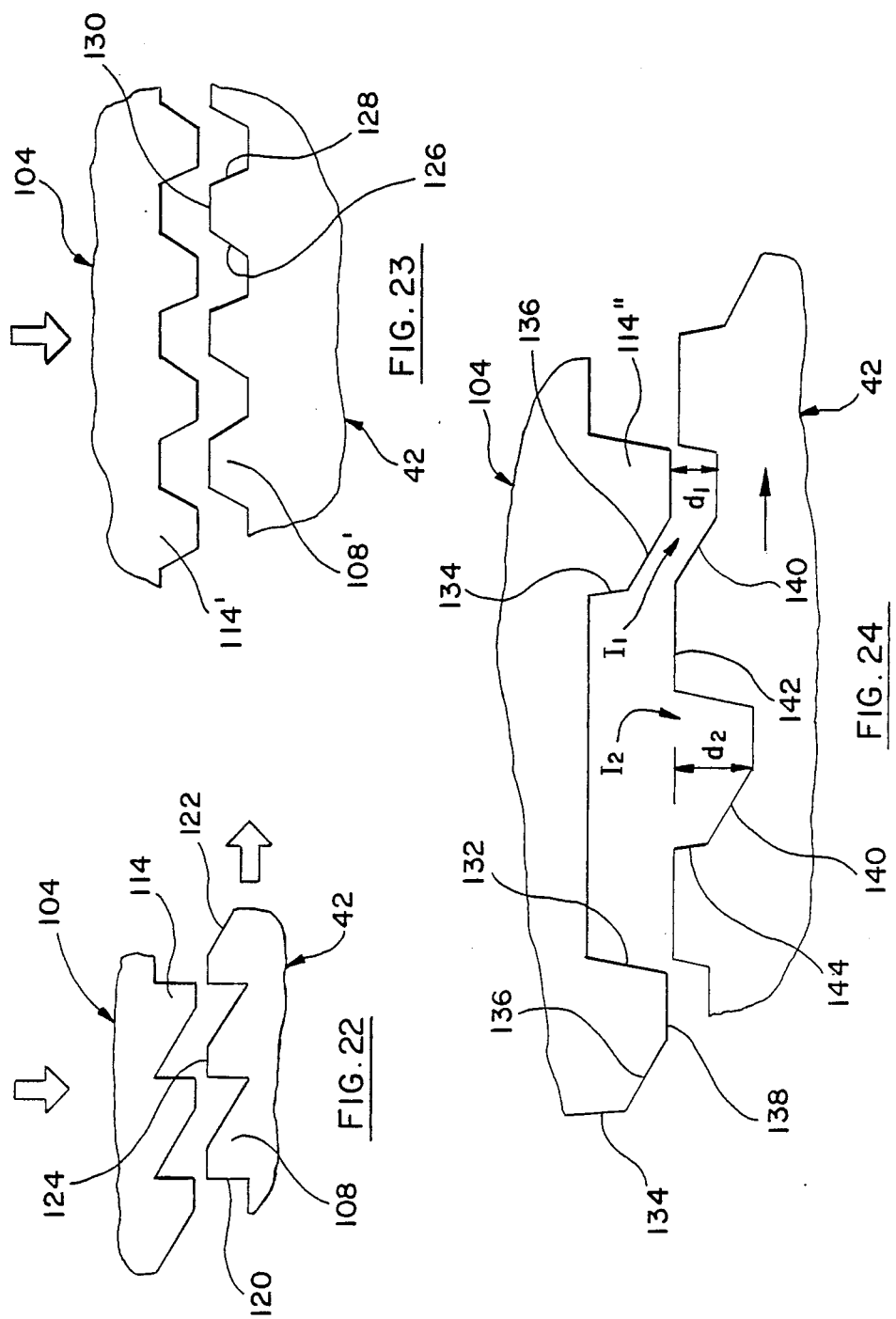

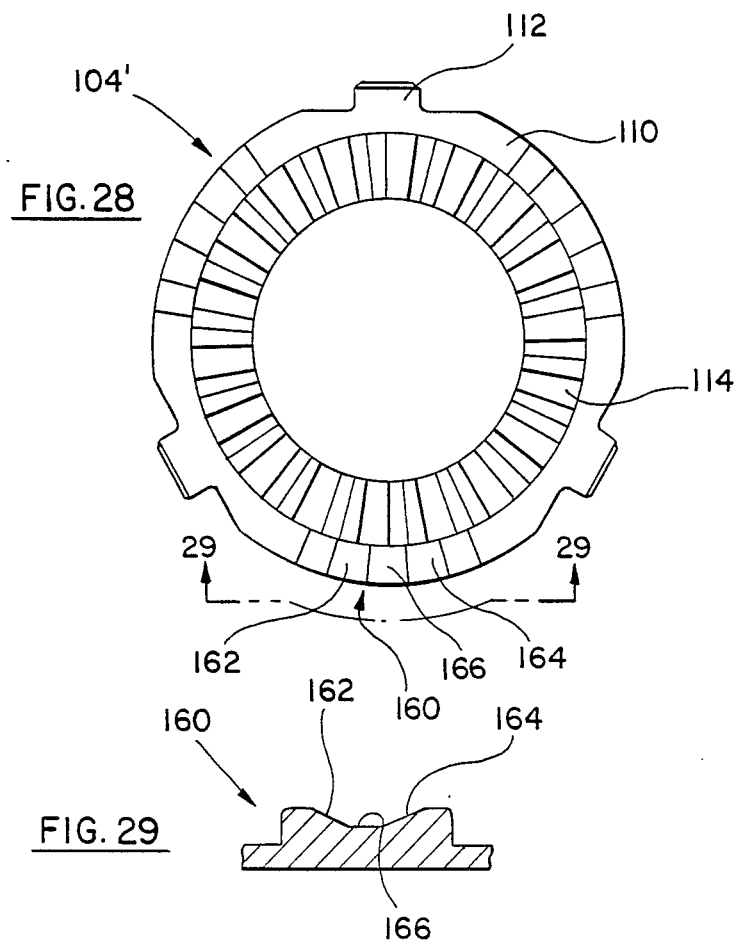
FIG. 28
FIG. 29
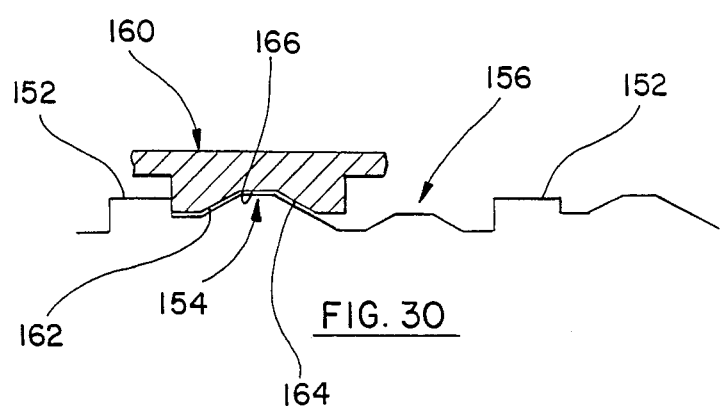
FIG. 30

KEYLESS CHUCK

BACKGROUND OF THE INVENTION

The present invention relates to a chuck for releasably gripping a tool bit and, more particularly, to a keyless chuck and a method of assembly that provides a chuck which can be hand-tightened to grip a tool bit for reliable bi-directional operation, and, further, which can selectively self-tighten in response to torque applied through the chuck.

Various types of chucks are known for releasably gripping the shank portion of a tool bit. The common Jacobs-style chuck includes a nosepiece which contains gripping jaws and a rotatably mounted adjusting sleeve that is adjusted to cause the jaws to grip or release a tool bit. The adjusting sleeve includes axially extending gear teeth that are adapted to cooperate with a gear-type key to permit manual tightening and loosening of the jaws. The requirement for a separate key necessitates a minimum level of manual skill to effect proper tightening of the jaws to avoid any slippage between the tool bit and the jaws. Additionally, the tightening key represents another part which is subject to loss or wear.

A number of drill chucks, known generically as keyless chucks, have been designed in an effort to eliminate the need for the tightening key. These chucks are adapted to apply an initial, hand-tightening gripping force to the tool bit with the chuck self-tightening in response to torque applied through the tool bit and the chuck. Some of these keyless chucks have been provided with gripping jaws which toggle in response to the reaction torque encountered by the tool bit and still others have been provided with cam-like surfaces which contact and cooperate with the gripping jaws to increase the gripping force.

It is important for any keyless chuck to grip the tool bit in response to initial hand-tightening by the operator with sufficient gripping force so that the tool bit will not slip during either forward or reverse operation. It is also important that the chuck, as it self-tightens in response to applied torque, not over-tighten to the extent that the jaws effect local surface crushing of the tool bit stem or cause a lock-up situation in which the chuck cannot be loosened. Over-tightening and lock-up are generally not encountered with power tools intended for the consumer market. However, where keyless chucks are used on power tools intended for the commercial or industrial market, the substantial torques provided by these tools can induce undesired over-tightening or lock-up.

Known chuck designs have used one-way ratchet type mechanisms to allow a chuck to self-tighten in response to increased torque applied through the chuck and the tool bit. These designs allow the chuck to self-tighten in a progressive manner so that the tool bit will be reliably gripped as the applied torque is increased and prevent loosening of the chuck as a consequence of reverse operation. For example, U.S. Pat. No. 4,213,623 to Rohm discloses a drill chuck that includes an adjusting sleeve rotatably mounted to a chuck body for adjusting the gripping force applied by jaws mounted within the chuck body. The adjusting sleeve and the chuck body are coupled together by a one-way pawl and ratchet assembly. As the chuck is tightened in response to rotation of the adjusting sleeve relative to the chuck body, the pawl incrementally ratchets to a new position to maintain the tightened condition of the chuck and prevent unintentional counter-rotation of the adjusting sleeve and loosening of the gripping jaws. In another chuck, as disclosed in U.S. Pat. No. 3,506,277 to Harms, an adjusting sleeve is rotatably mounted upon a chuck body to allow tightening or loosening of the gripping jaws. The chuck body includes ratchet teeth formed on an axial end face. The teeth are engagable with a similar set of teeth on a user adjustable spring-biased sleeve. The teeth interengage to allow rotation of the adjusting sleeve to tighten the grip on the tool bit but prevent counter-rotation that would tend to loosen the tool bit. While these chucks are reasonably effective for their intended purpose, the chuck operator does not have full control over the manner by which the adjusting sleeve is operated and, accordingly, these chucks lack optimum operational flexibility.

SUMMARY OF THE INVENTION

In view of the above, it is an object of the present invention, among others, to provide a keyless self-tightening chuck that will reliably grip a tool bit for operation in the forward or reverse operating directions.

It is another object of the present invention to provide a keyless chuck that can be hand-tightened and which self-tightens in response in applied torque and which maintains its self-tightened state.

It is another object of the present invention to provide a keyless chuck having a locking mechanism which allows the chuck adjusting sleeve to be locked against rotation in either direction and which locking mechanism can be selectively disabled.

It is another object of the present invention to provide a keyless chuck having a relatively low internal operating friction to permit convenient hand-tightening and self-tightening in response to torque applied through the chuck.

It is another object of the present invention to provide a keyless chuck having a zero capacity characteristic which allows the chuck to grip small diameter tool bits.

It is another object of the present invention to provide a method of assembly for a keyless chuck in which run-out of the finished chuck is minimal.

It is another object of the present invention to provide a keyless chuck having minimal run-out and which can be repeatedly disassembled, serviced, and reassembled while maintaining the run-out tolerance.

In view of these objects, and others, the present invention provides a keyless chuck having a jaw housing with jaws that are advanced in respective guideways to grip a tool bit and retracted to loosen the grip on the tool bit. A jaw thrust member is coupled to the jaws and is forced forwardly or rearwardly to advance or retract the jaws. A chuck adjusting nut is coupled to the jaw housing and is in threaded engagement with a threaded chuck spindle. The remote end of the spindle includes a projection which engages the jaw thrust member through a small-area contact patch to limit the operating friction contribution of the jaw thrust member and thus provide a chuck which can be readily hand-tightened by the user and self-tightened in response to torque transmitted through the chuck. A lock mechanism is provided to selectively lock a chuck adjusting sleeve relative to the jaw housing to allow uni-directional movement of the chuck adjusting sleeve relative to the jaw housing or bi-directionally lock the chuck adjusting sleeve relative to the jaw housing. The lock mechanism includes a lock plate coupled to a chuck adjusting sleeve and includes a set of teeth on an axial face for engagement with complementary teeth on an axial face of the chuck adjusting nut. The lock plate is normally spring-biased into engagement with the chuck adjusting nut. Depending upon the tooth configuration, the chuck adjusting nut can be operated in one direction during hand-tightening of the chuck and during the application of a torque transmitted through the chuck to facilitate self-tightening or fully locked against relative rotation. A user-operable control sleeve allows the lock plate to be disengaged from the chuck adjusting nut to temporarily disable the locking mechanism, or, in another embodiment, rotated to disengage the lock plate from the chuck adjusting nut to selectively disable the lock mechanism.

The keyless chuck is assembled in such a way that the run-out of the finished chuck is minimal. At least one of the mating surfaces of the jaw housing and the chuck adjusting nut is designed to deform during the assembly process to accommodate accumulated manufacturing tolerances with the relationship of the various parts maintained during the operating life of the chuck. The keyless chuck can be disassembled for cleaning and service and re-assembled without loss of run-out.

The present invention advantageously provides a keyless chuck having a relatively low internal operating friction because of the small-area contact between the main spindle and the jaw thrust member as well as a locking mechanism that can provide for uni-directional or bi-directional locking of the chuck adjusting sleeve relative to the jaw housing as well as selective disablement locking mechanism. The chuck is initially assembled with at least deformable surface which accommodates any accumulated manufacturing tolerances to provide a finished chuck having minimal run-out.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 11 is a side view, in partial cross-section, of a main spindle;

FIG. 12 is an enlarged detailed view of the remote end of the main spindle of FIG. 11 in engagement with the jaw thrust member of FIGS. 8, 9, and 10;

FIG. 13 is an end view of a chuck adjusting sleeve;

FIG. 14 is a side view, in cross-section, of the chuck adjusting sleeve of FIG. 13;

FIG. 15 is an end view of the chuck adjusting sleeve from the side opposite that shown in FIG. 13;

FIG. 16 is an end view of a chuck adjusting nut illustrating a set of teeth on the end surface;

FIG. 17 is a side view, in cross section, of the chuck adjusting nut of FIG. 16;

FIG. 18 is an end view of a lock plate illustrating a set of teeth for selective interengagement with the teeth of the chuck adjusting nut illustrated in FIG. 16;

FIG. 19 is a side view, in cross-section, of the lock plate of FIG. 18;

FIG. 20 is an end view of the lock plate from the side opposite that of FIG. 18;

FIG. 22 is a detailed view of a first set of interengaging teeth for selectively locking the chuck;

FIG. 23 is a detailed view of a second set of interengaging teeth for selectively locking the chuck;

FIG. 24 is a detailed view of a third set of interengaging teeth for selectively locking the chuck;

FIG. 28 is an end view of a second embodiment of a lock plate for cooperation with the control sleeve of FIGS. 25 and 26;

FIG. 29 is a detailed view of a cam formation of the lock plate of FIG. 28;

FIG. 30 is a detailed view illustrating the engagement of the cam profile of the control sleeve interengaging the cam formation of the lock plate of FIG. 28;

DESCRIPTION OF THE PREFERRED EMBODIMENT

Figure 1:
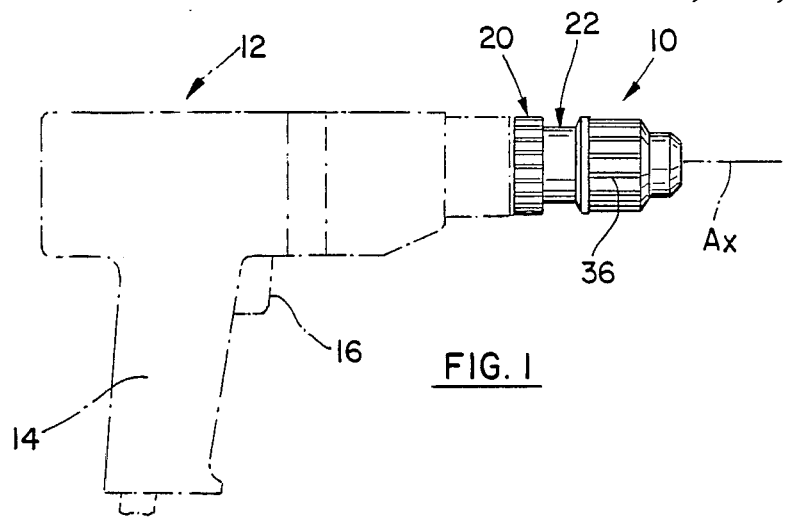
FIG. 1 is a side view of a keyless chuck in accordance with the present invention mounted on an exemplary pistol-grip electric drill.
Figure 2:
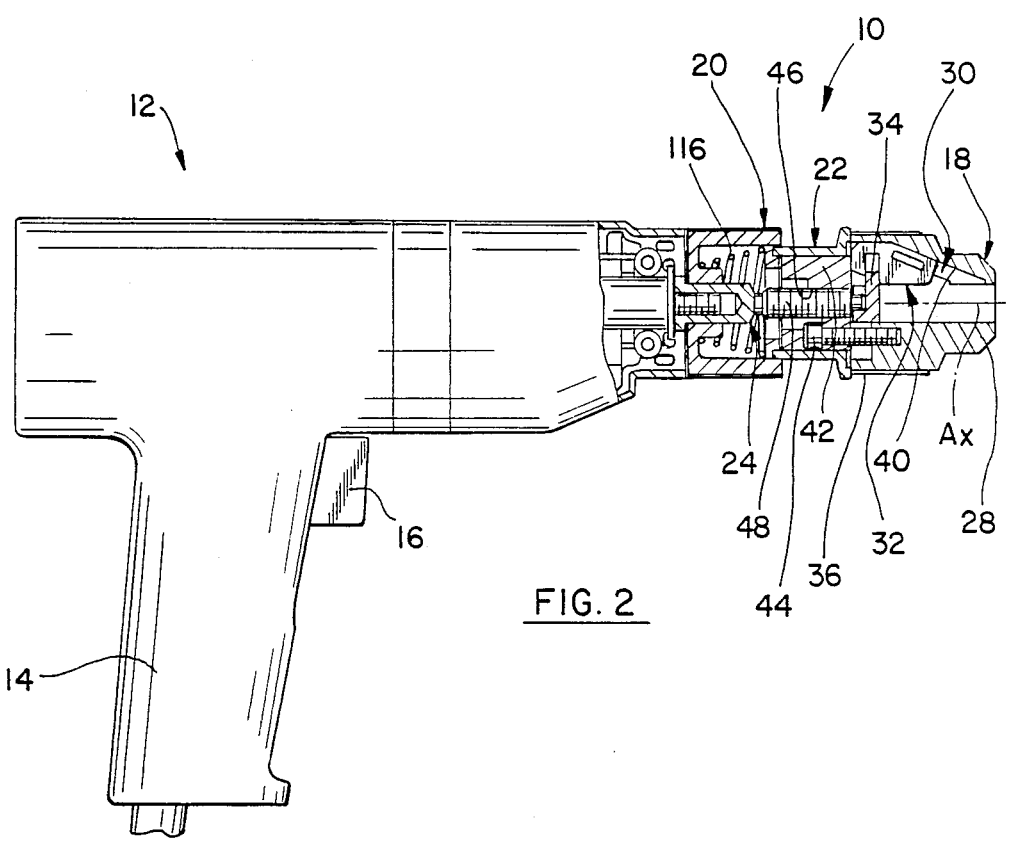
FIG. 2 is an enlarged cross-sectional view of the keyless chuck of FIG. 1, the chuck of the type designed to be threaded onto and removed from the drive spindle of the electric drill.

A keyless chuck in accordance with the present invention is designated generally in the figures by the reference character 10 and is shown in FIGS. 1 and 2 mounted on an exemplary pistol-grip electric drill 12 of the type having a handle 14 and a conventional trigger-type control switch 16. As shown in FIG. 1 and in the cross-sectional views of FIGS. 2–5, the keyless chuck 10 is defined about an axis $A_x$ and includes a jaw assembly 18, a chuck adjusting sleeve 20, a control sleeve 22, and a main spindle 24.

Figure 3:
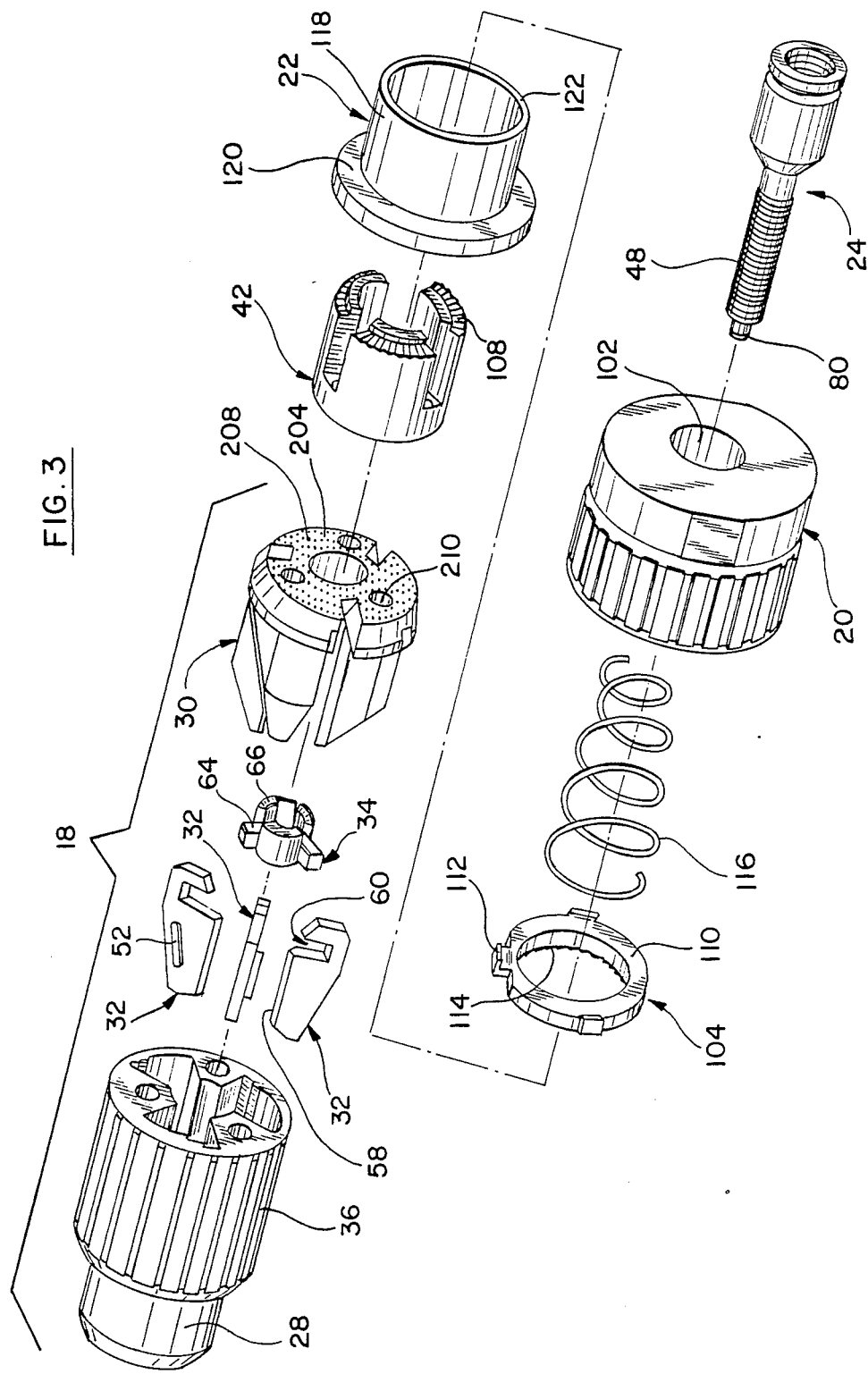
FIG. 3 is an exploded perspective of the keyless chuck of FIGS. 1 and 2.
Figure 4:
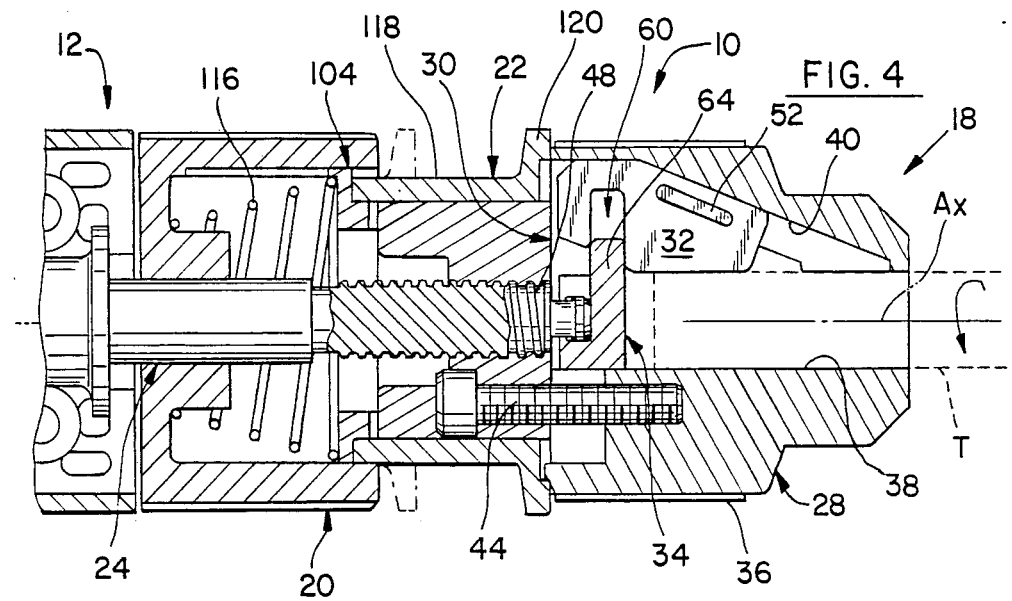
FIG. 4 is a cross-sectional view of a keyless chuck of the type designed to be integrally assembled with the electric drill, the jaws shown in a retracted position.

As shown in FIGS. 1–5, the jaw assembly 18 includes a jaw housing 28 formed as a body of revolution about the axis $A_x$ and includes an external serrated gripping surface 36 (FIG. 1) to facilitate manual gripping and an interior bore 38 for accepting tool bits "T" of various diameters, as represented in dotted line illustration in FIG. 4. The jaw guide 30 is received within internal openings in the jaw housing 28 to define three guideways 40 that each receive a respective jaw 32 for controlled movement between, respectively, the retracted and advanced positions of FIGS. 4 and 5. The angle of inclination between the guideways 40 and the axis $A_x$ is selected as a function of the intended application, a 20° angle being preferred for commercial duty chucks and a 30° angle suitable for consumer-type applications. The jaws 32 are connected to a jaw thrust member 34 which, in turn, is coupled to the end of the main spindle 24, as explained more fully below. A chuck adjusting nut 42 is secured to the rearwardly facing end of the jaw assembly 18 by threaded fasteners 44 and includes a threaded internal bore 46 in engagement with complementary threads 48 of the main spindle 24 so that rotation of the jaw assembly 18 about the axis $A_x$ in the direction indicated in FIG. 5 causes the jaws 32 to advance in the forward direction in their respective guideways 40 to grip a tool bit "T". Conversely, rotation of the jaw assembly 18 about the axis $A_x$ in the direction indicated in FIG. 4 will cause the jaw assembly 18 to move to the right relative to the main spindle 24 and cause the jaws 32 to retract rearwardly in their respective guideways 40 to loosen the grip on a tool bit "T".

The jaw housing 28 is preferably manufactured using powdered metal techniques and the jaw guide 30 is preferably manufactured from die-cast aluminum to present a rear face, as explained below, that is configured to deform during assembly of the chuck to accommodate any accumulated manufacturing tolerances and provide a finished chuck having minimal run-out.

Figure 6:
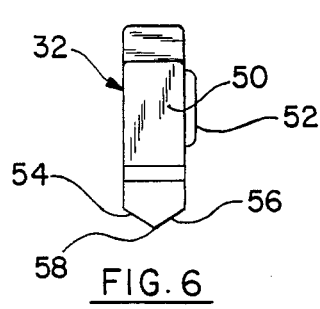
FIG. 6 is an end view of a jaw for gripping a tool bit.
Figure 7:
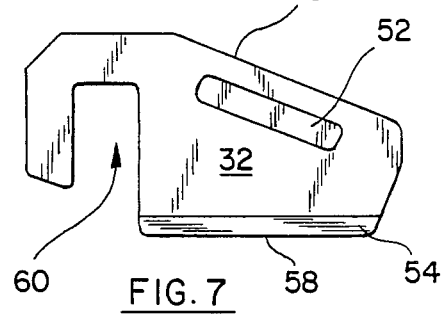
FIG. 7 is a side view of the jaw shown in FIG. 6.

As shown in FIGS. 6 and 7, the jaws 32 each include an inclined outwardly facing surface 50 that bears against the guideway 40 in the jaw housing 28, a laterally extending boss 52 that is retained within a trackway (not shown) of the jaw housing 28, and converging surfaces 54 and 56 that define an inwardly facing edge 58 that is adapted to engage the outside diameter surface of a tool bit "T" in the usual manner. The angle between the tool engaging surface 58 and the inclined surface 50 is equal to the guideway 40 angle as discussed above. Each jaw 32 includes a slot 60 adjacent its rearward end for receiving a portion of the jaw thrust member 34 so that the jaws 32 move as a unit in response to relative movement of the jaw thrust member 34. In the preferred embodiment, the jaws 32 are fine-flow blanked from rolled sheet stock having preformed inclined converging jaw surfaces that are coined to their finished dimension to define the surfaces 54 and 56 and the tool bit engaging edge 58. The configuration of the jaws 32 provides a keyless chuck 10 having a 'zero capacity', that is, a chuck which can tighten upon small diameter tool bits "T".

Figure 8:
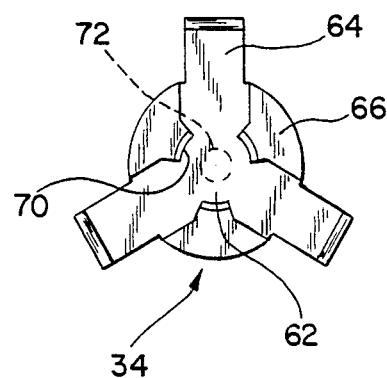
FIG. 8 is a plan view of a jaw thrust member.
Figure 9:
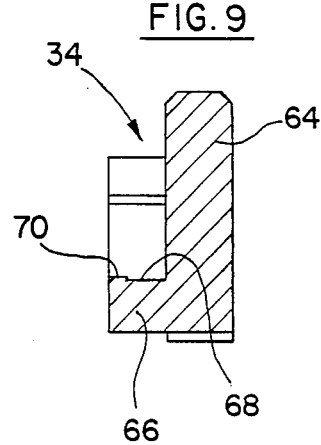
FIG. 9 is a cross-sectional view of the jaw thrust member of FIG. 8.
Figure 10:
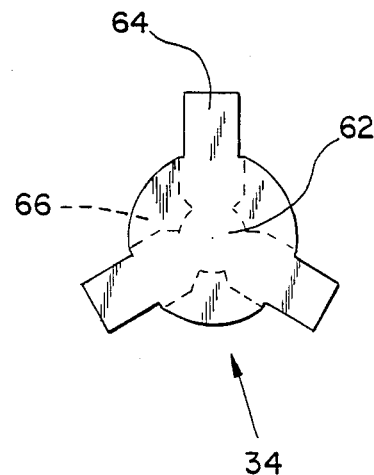
FIG. 10 is a view of the jaw thrust member of FIGS. 8 and 9 from the side opposite that shown in FIG. 10.

As shown in FIGS. 8, 9, and 10, the jaw thrust member 34 includes a central portion 62 and three radially outward extending and equi-spaced arms 64. Three upstanding sections 66 are provided between the arms 64 and define a central opening for engaging a projection at the end of the main spindle 24 as explained below. The inwardly facing surfaces of the upstanding sections 66 include a first surface 68 formed at a first diameter and second surface formed at a somewhat smaller diameter to define an inwardly facing rim 70, as shown in FIG. 9, at the upper edge of the upstanding sections 66. As explained below, the upstanding sections 66 constrain the remote end of the main spindle 24 to engage a small-area contact patch 72 (dotted line illustration in FIG. 8) to apply a thrust force against the jaw thrust member 34 which, in turn, applies the thrust against the jaws 34 to forcibly advance or retract the jaws 32.

The main spindle 24, shown in partial cross-section in FIG. 11, includes an enlarged diameter portion 74 at its rearward section having an internal threaded bore 76 for engaging the threaded drive spindle 26 (FIG. 2) of the pistol-grip electric drill 12 in the usual manner. A reduced diameter axially extending section 78 carrying the threads 48 extends forwardly of the enlarged diameter section 74 and carries the threads 48 for engaging the chuck adjusting nut 42 as described above. The main spindle 24 includes a projection, indicated generally at 80, at its remote end for engaging the jaw thrust member 34. The projection 80 is defined by a reduced diameter portion 82, a somewhat enlarged rim 84, a conically tapered portion 86, and, lastly, a flat forwardly facing thrust surface 88.

As shown in the enlarged detail of FIG. 12 and in FIGS. 3 and 4, the projection 80 extends between the inwardly facing surfaces of the upstanding sections 66 of the jaw thrust member 34 with the outside diameter of the rim 84 of the projection somewhat larger than the inside diameter of the rim 70 of the jaw thrust member 34 so that the projection 80 must be forced between the upstanding sections 66 to allow the remote end of the projection 80 to 'snap' into engagement with the jaw thrust member 34 and thus releasably retain the two parts together while allowing relative rotation. The flat thrust surface 88 of the projection 80 is designed to bear against the small-area contact patch 72 (shown in FIG. 8) of the jaw thrust member 34 to apply a thrust force to the jaw thrust member 34 and, in turn, apply the thrust force to the jaws 32 through the radially extending arms 64. In general, the contact patch 72 surface area is, of course, smaller than the cross-sectional area of the main spindle 24 and is preferably defined by a diameter dimension one-half that of the main spindle 24. The remote end of tee main spindle 24 is preferably induction hardened and the jaw thrust member 34 is preferably formed using powdered metal techniques to provide contacting surfaces of sufficient hardness to accommodate the expect surface stresses.

The provision of a small-area contact patch 72 between the remote end of the main spindle 24 and the jaw thrust member 34 contributes to a reduction of the internal friction in the keyless chuck 10 since any forces developed as a consequence of relative rotation between the main spindle 24 and the jaw thrust member 34 are located at relatively small radii from the axis $A_x$ and, accordingly, the torque and the contribution to the operating friction of the keyless chuck 10 will be low.

The chuck adjusting sleeve 20, as shown in FIGS. 3, 14, and 15, includes an outer cylindrical section 90, an endwall 92 at its rearward end, and an inner cylindrical extension 94 that is formed coaxially with the operating axis $A_x$ of the chuck 10. The cylindrical section 90 includes three longitudinally extending slots 96 formed on its inner wall surface for engaging a locking plate, as explained below, and a series of longitudinal striations 98 on its exterior surface to facilitate manual gripping of the adjusting sleeve 20. A pair of parallel flats 100 are formed on the exterior surface of the adjusting sleeve 20 (FIG. 13) adjacent the endwall 92 to facilitate gripping with a wrench or similar tool. The inner cylindrical extension includes a through bore 102 that accepts the enlarged diameter portion 74 of the main spindle 24 with an interference fit to secure the chuck adjusting sleeve 20 and the main spindle 24 together. If desired, additional locking devices, including various types of snap-rings and clips, may be used to assist in securing the components together.

Figure 5:
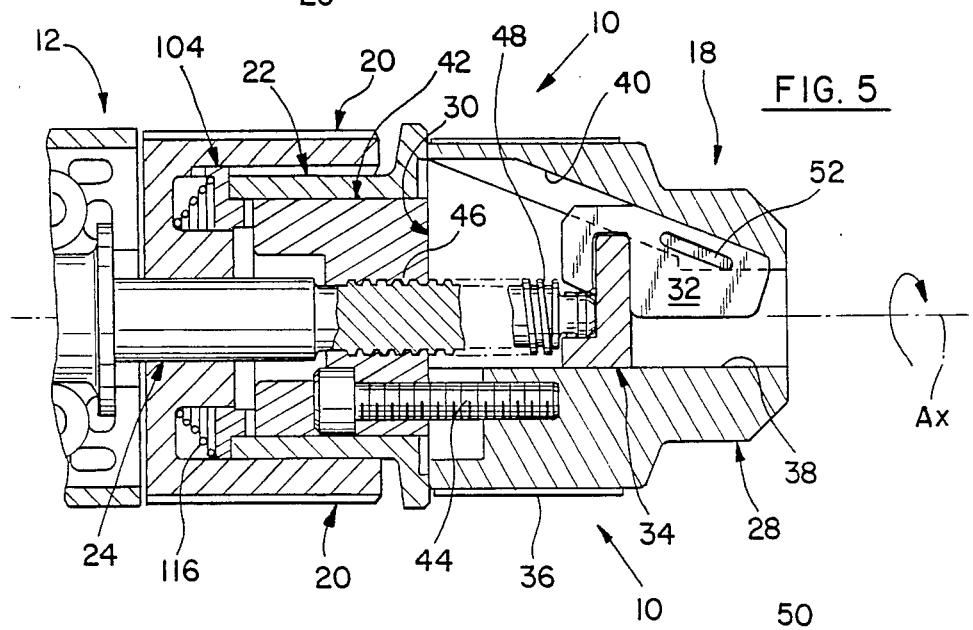
FIG. 5 is a cross sectional view of the keyless chuck of FIG. 4 with the jaws in an advanced position.

As shown in FIGS. 4 and 5, the main spindle 24 and the chuck adjusting sleeve 20 are secured to the drive spindle 26 with the reduced diameter portion 78 of the main spindle 26 in threaded engagement with the chuck adjusting nut 42 so that rotation of the jaw assembly 18 and the connected jaw adjusting nut 42 relative to the chuck adjusting sleeve 20 will advance or retract the jaws 32 in the jaw housing 28.

Figure 17A:
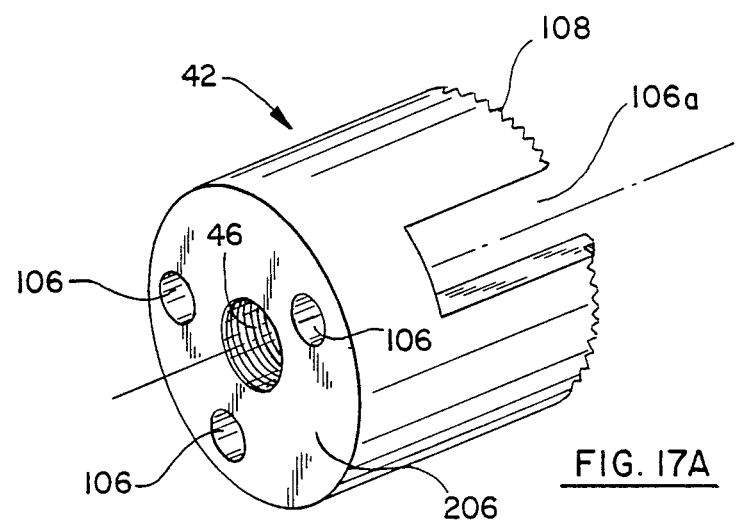
FIG. 17A is an isometric view of the chuck adjusting nut of FIGS. 16 and 17.
Figure 17B:
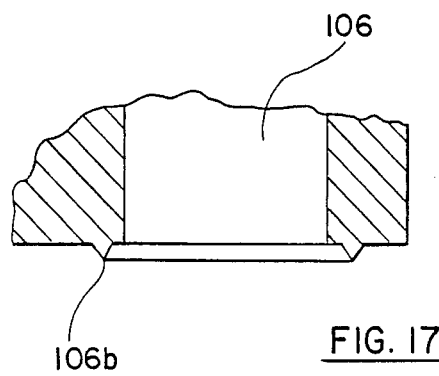
FIG. 17B is a detailed view, in cross-section, of the chuck adjusting nut of FIG. 17 taken along line 17B—17B of FIG. 17.

In accordance with one feature of the present invention, the keyless chuck 10 includes a locking mechanism which allows the chuck adjusting sleeve 20 and the jaw assembly 18 to be rotated relative to one another to allow hand-tightening of the chuck or self-tightening in response to torque transmitted through the chuck and which can be controlled by the operator to prevent counter rotation tending to loosen the chuck during reverse operation. Additionally, the locking mechanism can lock the chuck adjusting sleeve 20 and jaw assembly 18 from rotation in either direction and, in one form of the invention, can be selectively enabled or disabled by the operator. As shown in FIGS. 16-20, the lock mechanism includes the chuck adjusting nut 42, described above, and a lock plate 104. The chuck adjusting nut 42 (FIGS. 16-17B) includes the central threaded bore 46 that engages the reduced diameter portion of the main spindle 24, as described above, and a plurality of bores 106 through which the threaded fasteners 44 secure the chuck adjusting nut 42 to the jaw assembly 18. The bores 106 are distributed about the central axis of the chuck adjusting nut 42 in an unequal angular distribution so that the chuck adjusting nut 42 and the jaw assembly 18 can be assembled in a unique relationship to allow the chuck 10 to be disassembled, serviced, and reassembled without loss of the as-manufactured run-out, as described more fully below. In the preferred embodiment and as shown in FIG. 16, the bores 106 are spaced apart by unequal angular spacings $A_1$, $A_2$, and $A_3$ with the angular spacing $A_1$ equal to 120°, the angular spacing $A_2$ equal to 115°, and the angular spacing $A_3$ equal to 125°. The rearwardly facing end of the chuck adjusting nut 42 is provided with a circular pattern of radially aligned teeth 108 which cooperate with the lock plate 104 to effect the unidirectional or bi-directional locking function. As shown in FIGS. 17 and 17A, the tooth pattern is interrupted by clearance slots 106a for the threaded fasteners 44. Additionally and as shown in the detail of FIG. 17B, annular rims 106b surround each of the bores 106 and project a small distance (e.g., 0.005 inch) from the forward face of the chuck adjusting nut 42. Preferably, the annular rims 106b have a triangular profile with a forwardly pointing edge penetrating the deformable rear surface of the jaw assembly 18 during manufacture of the keyless chuck 10, as described below.

The lock plate 104 (FIGS. 18-20) includes a circular, ring-like portion 110 with three tabs 112 extending radially outward from the circumferential edge of the circular portion 110. A series of radially aligned teeth 114 are provided on one face of the ring-like portion 110 and are designed to selectively engage the teeth 108 on the chuck adjusting nut 42 as explained below. The lock plate 104 is received within the chuck adjusting sleeve 20 with its teeth 114 facing forwardly and the tabs 112 received within the slots 96 (FIGS. 14 and 15) formed on the interior of the chuck adjusting sleeve 20. As shown in FIGS. 3, 4, and 5, a helical coil spring 116 is contained within the chuck adjusting sleeve 20 and resiliently biases the lock plate 104 in the forward direction.

Figure 21:
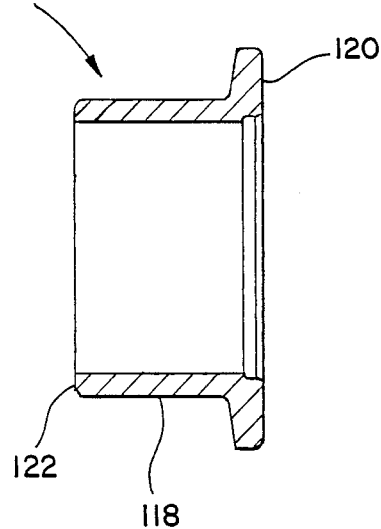
FIG. 21 is a side view, in cross-section, of a control sleeve.

The control sleeve 22 is journalled on the outside diameter of the chuck adjusting nut 42 between the rear face of the jaw assembly 18 and the lock plate 104 and is freely rotatable about the chuck adjusting nut 42. As shown in FIG. 21, the control sleeve 22 includes an extended tubular section 118 and a radially outward extending flange 120 at its forward end. The opposite end 122 of the tubular section 118 normally abuts the lock plate 104 which is then effective to resiliently bias the flange 120 against the rear face of the jaw assembly 18 in response to the force applied by the helical coil spring 116.

As shown in FIGS. 4 and 5, the control sleeve 22 is normally biased in the forward direction by the spring-biased lock plate 104 to allow the teeth 114 on the lock plate 104 to engage the mating teeth 108 formed on the rearwardly facing end of the chuck adjusting nut 42. The control sleeve 22 is rotatably mounted on the chuck adjusting nut 42 and, as shown in solid and dotted line illustration in FIG. 4, can be moved by the operator from a forward position against the biasing force of the spring 116 to a rearward position to disengage the teeth 114 of the lock plate 104 from the teeth 108 of the chuck adjusting nut 42. As explained below, the selection of the profile of the teeth 108 and 114 as well as the force applied by the spring 116 can be selected to control the chuck to fully lock the jaw assembly 18 from rotation relative to the chuck adjusting sleeve 20 in either the forward or reverse direction, to allow relative rotation in the forward direction only in response to hand tightening of the chuck as well as torque transmitted through the chuck, and to selectively enable or disable the locking function.

FIG. 22 illustrates a first tooth profile for the teeth 114 of the locking plate 104 and the teeth 108 of the chuck adjusting nut 42. As shown, each tooth includes a relatively steeply pitched flank 120, a relatively shallow pitch flank 122, and a flat crest 124. The lock plate 104 is resiliently urged downward in FIG. 22 by the urging force of the spring 116 so that the teeth 114 and 108 interengage. When the jaw assembly 18 and the connected chuck adjusting nut 42 are rotated in the direction indicated, for example, when hand-tightening the chuck on a tool bit "T", the profile of the teeth 114 and 108 permit relative rotation to allow the jaws 32 to tighten on the tool bit "T". Conversely, the tooth profile prevents any counter rotation which would tend to loosen the grip on the tool bit "T". Additionally, the tooth profile configuration allows the chuck to self-tighten in response to torque transmitted through the chuck 10 from the drive spindle 26 to the tool bit "T". More specifically, as the tool bit "T" engages a work piece, a reaction torque is developed that tends to rotate the jaw assembly 18 about the main spindle 24 to advance the jaws 32 and cause them to tighten their grip on the tool bit "T". As this relative rotation takes place, the teeth 114 and 108 increment relative to one another to new relative positions. Since the tooth profile of FIG. 22 prevents reverse rotation of the jaw assembly 18 relative to the chuck adjusting sleeve 20, there is no tendency for the keyless chuck 10 to loosen, even if the direction of the drive spindle 26 is reversed. In order to release the tool bit "T", the control sleeve 22 is manually grasped and pulled rearwardly against the resilient urging force of the spring 116 to fully disengage the lock plate 104 from the end of the chuck adjusting nut 42. When the lock plate 104 and the chuck adjusting nut 42 are disengaged, the jaw assembly 18 can be counter rotated relative to the chuck adjusting sleeve 20 to cause the jaw assembly 18 to advance forwardly relative the main spindle 24 and retract the jaws 32 to thus loosen the grip on the tool bit "T".

The tooth profile of FIG. 22 is well-suited for use in consumer-type power tools where the ultimate torque provided by the tool is sufficient to allow the keyless chuck 10 to fully self-tighten without danger of over-tightening or lock-up. In the case of industrial power tools, however, the ultimate torque provided by the tool can be sufficient to allow the keyless chuck 10 to over-tighten and distort components within the chuck or cause the jaws 32 to crush the surface of the tool bit "T".

FIG. 23 illustrates a second tooth profile suitable for use on industrial grade tools where it is desirable to 'lock' the keyless chuck 10 from rotation in either direction. As shown, the teeth 114' and 108' have identical steeply inclined flanks 126 and 128 and a flat crest 130. When the teeth 114' and 108' are interengaged, any torque transmitted through the keyless chuck 10 will be insufficient to allow the teeth 114' and 108' to increment relative to one another to allow self-tightening in the forward direction or, conversely, loosening in the reverse direction. Where the tooth profile of FIG. 23 is used, the keyless chuck 10 is hand-tightened by first pulling the control sleeve 22 rearwardly to disengage the lock plate 104 from the chuck adjusting nut 42 and is maintained in that position while rotating the jaw assembly 18 relative to the chuck adjusting sleeve 20 until the jaws 32 tighten on the tool bit "T". After hand-tightening is accomplished, the control sleeve 22 is released to allow the spring 116 to urge the lock plate 104 forwardly to engage the teeth 108' and 114'. In this situation, the angle of the guideway 40 of the jaw housing 28 relative to the axis $A_x$ is chosen so that hand-tightening of the keyless chuck 10 applies sufficient gripping force to prevent the tool bit "T" from slipping relative to the jaws 32 when the tool's full torque capacity is utilized in either the forward or reverse direction. The tooth pattern of FIG. 23 thus prevents self-tightening when applying torque in the forward direction or loosening when operating in the reverse direction.

A third tooth profile is shown in FIG. 24 and functions to allow the keyless chuck 10 a measure of incremental self-tightening before self-locking. As shown in FIG. 24, the lock plate 104 is provided with teeth 114" having a relatively steep flank 132, another flank defined by surfaces 134 and 136, and a flat crest 138. The chuck adjusting nut 42 is configured with a profile complementary to that of the teeth 114" to define a series of recurring indentations $I_1$ and $I_2$ with the indentation $I_1$ having a first depth $d_1$ and the indentation $I_2$ having a second depth $d_2$. As shown, the indentation $I_1$ includes an inclined surface 140 designed to engage the surface 136, and the indentation $I_2$ includes the surface 140 for engaging the surface 136 of the tooth 114" and another surface 144 for engaging the surface 134 of the tooth 114". When the control sleeve 22 is released after hand-tightening of the keyless chuck 10, the tooth 114" will advance into indentation $I_1$ so that the surface 136 will engage the surface 140. In this configuration, any additional torque transmitted through the chuck 10 in response to the application of the tool bit "T" to the work piece will cause the chuck adjusting nut 42 to rotate to the right in FIG. 24, as indicated by the arrow, effecting a proportional self-tightening of the keyless chuck 10 and causing the tooth 114" to 'ride' upwardly on the surface 140 of indentation $I_1$ and move along the surface 142 between the indentations to indentation $I_2$ where the tooth 114" will enter indentation $I_2$ with the surface 136 engaging the surface 140 and the surface 134 engaging the surface 144. Since the indentation $I_2$ has a greater depth dimension $d_2$, a further increase in the torque transmitted through the keyless chuck 10 will be ineffective to cause further incrementing and self-tightening. As can be appreciated, the tooth profile of FIG. 24 allows for hand-tightening of the chuck on the tool bit "T" and a limited amount of self-tightening of an under-tightened chuck in response to torque transmitted through the keyless chuck 10.

Figure 26:
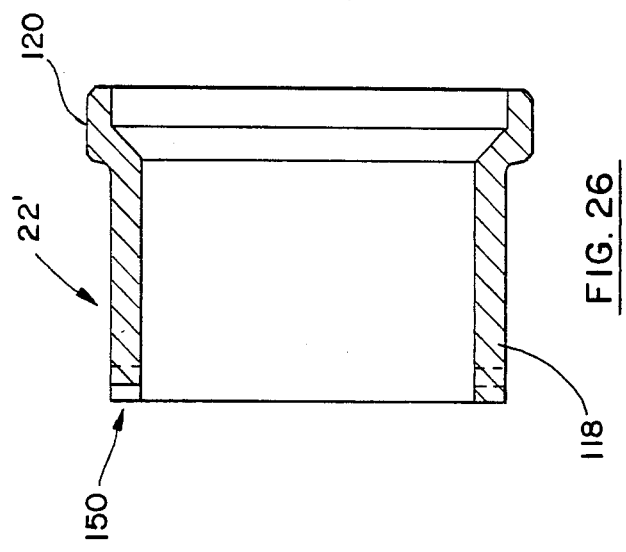
FIG. 26 is a side view, in cross-section, of the control sleeve of FIG. 25.
Figure 27:
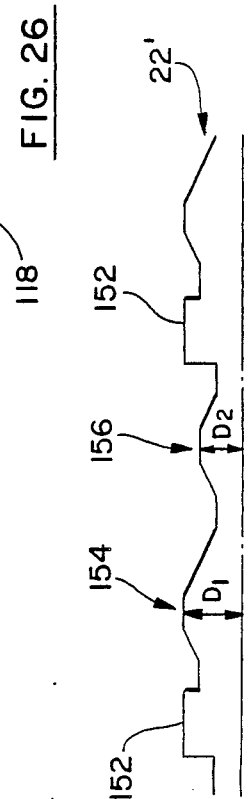
FIG. 27 is a detailed view of a cam profile of the control sleeve of FIGS. 25 and 26.
Figure 25:
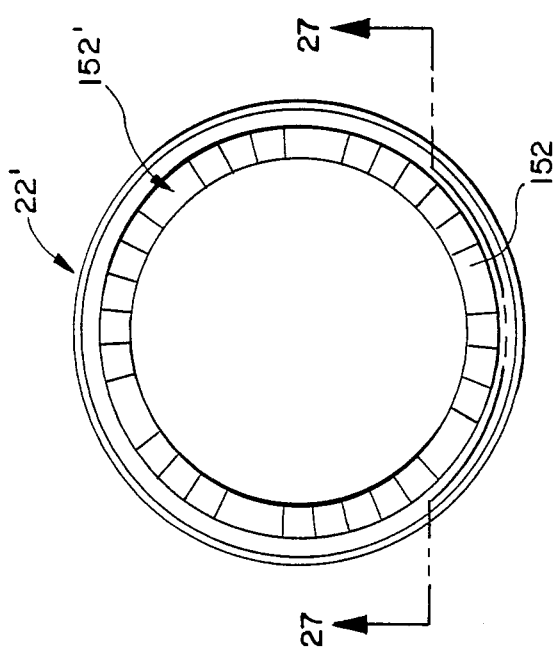
FIG. 25 is an end view of a second embodiment of a control sleeve.

In the embodiment described above, the control sleeve 22 is normally urged in the forward direction with the spring 116 pushing the lock plate 104 into engagement with the chuck adjusting nut 42. In order to temporarily disengage the lock plate 104 from the chuck adjusting nut 42, the operator pulls the control sleeve 22 rearwardly against the force of the spring 116. A second embodiment of a control sleeve 22' and modified lock plate 104' are illustrated in FIGS. 25-30. As shown in FIGS. 25-27, the control sleeve 22' is similar in overall configuration to the control sleeve 22 of FIG. 21 and includes an axially extending tubular section 118, a radially enlarged portion 120 at its forward end, and a lock plate camming surface 150 at its rearward end. As shown in FIG. 27, the camming surface 150 includes a series of spaced apart axially extending tabs 152 with a first cam 154 and a second cam 156 located between each set of tabs 152. As shown, each of the cams 154 and 156 has respective rising cam surfaces and a flat dwell surface with the cam 154 having a relatively higher dwell surface than the cam 156.

The lock plate 104' is similar in structure as that shown in FIGS. 18-20 and includes a ring-like portion 110 having three radially extending tabs 112 and a series of radially aligned teeth 114 on one side surface. As shown in FIG. 29, the lock plate 104' also includes three equi-spaced cam formations 160 radially outward of the teeth 114. As shown in FIG. 29, the cam formations 160 each include oppositely inclined cam surfaces 162 and 164 and an intermediate surface 166.

The control sleeve 22' and lock plate 104' are assembled with the other components of the keyless chuck 10 in the manner described above so that the axially extending tabs 152 of the control sleeve 22' lie on opposite sides of the cam formation 160 of the lock plate 104', as shown in FIG. 30. The control sleeve 22' is thus rotatable about the chuck adjusting nut 42 between a first position, shown in FIG. 30, in which the cam formation 160 of the lock plate 104' engages the cam 154 of the control sleeve 22', and a second position (not shown) in which the cam formation 160 engages the cam 156. When the control sleeve 22' is in the first position, the larger height $D_1$ of the cam 154 is effective to disengage the lock plate 104' of the chuck adjusting nut 42 and thus disable the locking effect of the teeth on the lock plate 104' and the chuck adjusting nut 42. Conversely, when the control sleeve 22' is rotated to the second position in which the cam formation engages the cam 156, the relatively smaller height $D_2$ allows the teeth 114 on the lock plate 104' to engage the cam adjusting nut 42 to enable the locking mechanism for operation.

As can be appreciated, the control sleeve 22' and lock plate 104' of FIGS. 28 to 30 allow disengagement of the locking mechanism by either pulling the control sleeve 22' rearwardly in the manner described above or by disabling or enabling the locking mechanism in response to rotation of the control sleeve 22' in one direction or the other.

Figure 31:
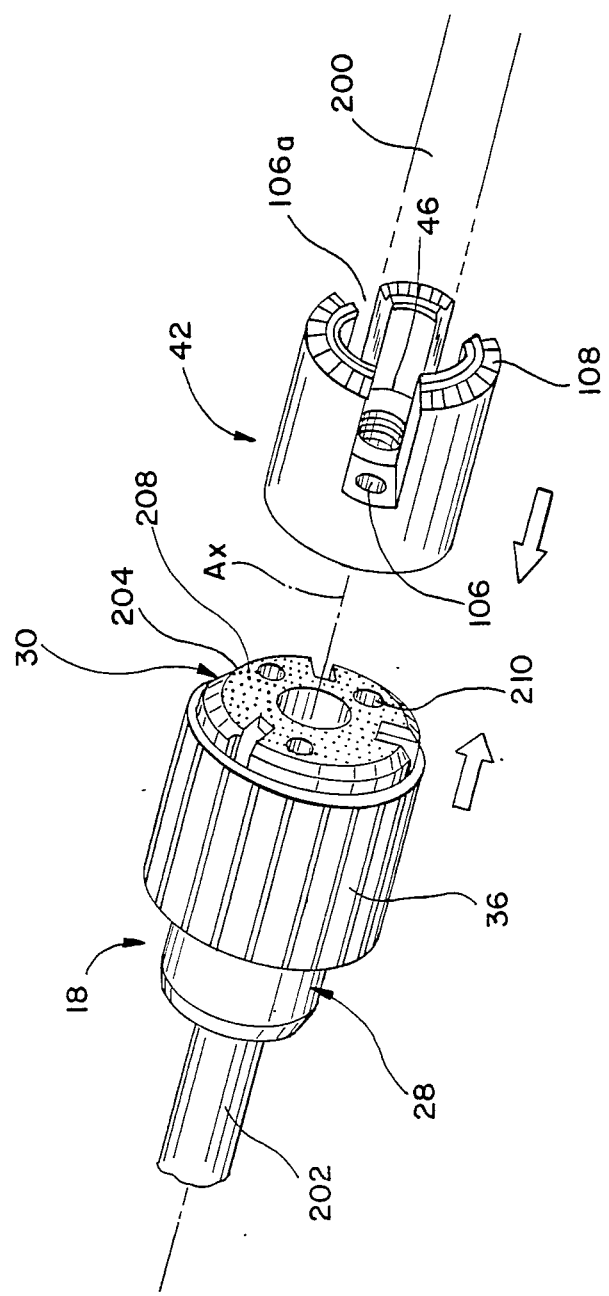
FIG. 31 is an isometric projection of jaw housing and chuck adjusting nut mounted on mandrels as part of the assembly method.
Figure 33:
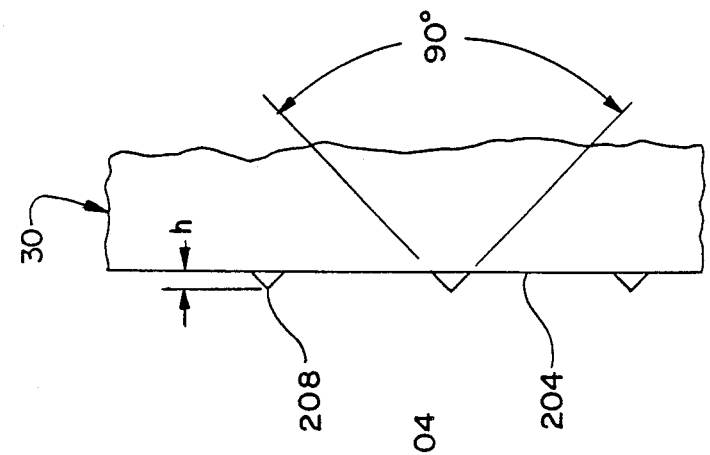
FIG. 33 is a side view of the surface shown in FIG. 32.

The major components of the keyless chuck 10 are assembled using a method by which the as-manufactured chuck has a very low run-out and which also allows the chuck to be repeatedly disassembled, serviced, and re-assembled without deterioration of the as-manufactured run-out. As shown in FIG. 31, the chuck adjusting nut 42 and the jaw assembly 18 are mounted on respective precision mandrels 200 and 202 that are in precise alignment with one another along the principal chuck axis $A_x$. The mandrels 200 and 202 are preferably of the expanding type and locate on axial bore surfaces of the respective components. For example, the mandrel 200 locates on the threaded bore 46 of the chuck adjusting nut 42, and the mandrel 202 locates on the interior bore 38 of the jaw assembly 18. When mounted on their respective mandrels 200 and 202, the chuck adjusting nut 42 and the jaw assembly 18 are thus in optimum axial alignment. As described above in connection with FIG. 3, the jaw assembly 18 is assembled, in part, from the jaw housing 28 and the jaw guide 30. While the chuck adjusting nut 42 and the jaw housing 28 are preferably manufactured using powdered metal techniques to provide precision surfaces and the jaw guide 30 is manufactured from a precision die-cast metal, such as aluminum, the accumulated tolerances of the components may be such that the mating surfaces of the chuck adjusting nut 42 and the jaw assembly 18 components, that is, the forward face 206 (FIG. 17A) of the chuck adjusting nut 42 and rearward face 204 of the jaw assembly 18 may be less than transverse to the principal axis $A_x$ and, accordingly, can contribute to the as-manufactured run-out of the chuck.

Figure 32:
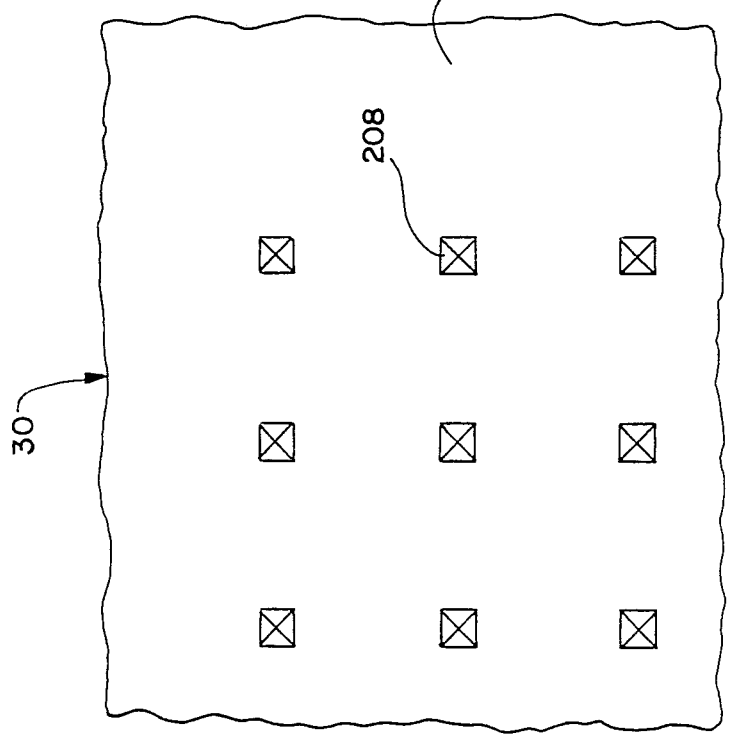
FIG. 32 is a detailed plan view of a rear surface portion of the jaw housing illustrating a plurality of deformable pyramids.

In order to minimize run-out during the initial assembly of the chuck during manufacture, one of the two mating surfaces, such as the rearward surface 204 of the jaw assembly 18 is defined by a deformable material. In the preferred embodiment, the jaw guide 30 (FIG. 3) is fabricated from aluminum and presents the surface 204, as shown in FIG. 31. In the alternative, a separate spacer disc or washer (not shown) having the desired characteristics can be provided. As shown in FIGS. 31 and 32, the surface 204 is provided with numerous pyramidal structures 208 extending upwardly from the surface 204. In the preferred form, the structures are formed as 4-sided pyramids having a height 'h' of between 0.005 and 0.015 inches and an included angle of 90°. The pyramids 208 are formed in a rectangular array although other patterns are suitable. The pyramids 208 are designed to present a deformable or crushable surface to the forwardly facing surface 206 of the chuck adjusting nut 42 and are preferably formed in during the die-casting of the jaw guide 30.

During the assembly of the keyless chuck 10, the chuck adjusting nut 42 is mounted on its mandrel 200 and the jaw assembly 18 is mounted on its mandrel 202. As indicated above, the mandrels 200 and 202 are precisely located on the principal axis $A_x$ of the chuck and thus co-align the chuck adjusting nut 42 and the jaw assembly 18 and position the surfaces 204 and 206 in a confronting relationship. While the rearwardly facing surface 204 of the jaw assembly 18 and the mating, forwardly facing surface 208 of the chuck adjusting nut 42 are nominally transverse to the principal axis $A_x$, manufacturing tolerances are such that these two surfaces may vary from their ideal transverse relationship. In this situation, were the two surfaces secured to together, the major axis of the chuck adjusting nut 42 would be skewed somewhat relative to that of the jaw assembly 18. Any tool bit "T" gripped by the jaw assembly 18 would then wobble about the principal $A_x$. In accordance with the present invention, the chuck adjusting nut 42 and the jaw assembly 18 are forced together, for example, under hydraulic pressure, while positionally constrained by the mandrels 200 and 202 to insure precise co-alignment of their respective major axes with the principal axis $A_x$. Where the surface 204 of the jaw assembly 18 and the surface 206 of the chuck adjusting nut 42 are not transverse to the principal axis $A_x$, that is, the surfaces 204 and 206 are non-parallel, the forcible engagement of the two surfaces 204 and 206 will cause selective crushing of the pyramid structures 208. More specifically and depending upon the initial non-transverse alignment of the surfaces 204 and 206, some of the pyramid structures 208 will be substantially crushed while others will be minimally crushed. As a result, an interface is created which is unique to each chuck adjusting nut 42 and jaw assembly 18 to accommodate their unique dimensional characteristics while precisely aligning the chuck adjusting nut 42 and its jaw assembly 18 along the principal axis $A_x$.

As explained above in relationship to FIG. 16, the bores 106 that accept the threaded fasteners 44 that retain the chuck adjusting nut 42 and the jaw assembly 18 together are asymmetrically aligned so that the chuck adjusting nut 42 and the jaw assembly 18 can be assembled in one and only one relative angular relationship. Thus, when the chuck adjusting nut 42 and the jaw assembly 18 are assembled in the manner described above, the resultant keyless chuck 10 has minimal run-out and can also be repeatedly disassembled and cleaned or otherwise serviced and re-assembled without loss or degradation of the original, as-manufactured run-out.

While pyramid structures 208 have been shown in the preferred embodiment, other surface configurations that provide the intended function are suitable, including various types of 'waffle' patterns. In general, the deformable structure of elements must have sufficient height 'h' to accommodate the expected range of misalignment of the surfaces 204 and 206 and be sufficiently spaced from one another to allow the deformed material to flow laterally.

As can be appreciated, the present invention provides a keyless chuck having a relatively low internal operating friction because of the small-area contact between the main spindle and the jaw thrust member as well as a locking mechanism that can be selectively disabled and enabled to provide for uni-directional or bi-directional locking of the chuck. The chuck is additionally assembled by a method that provides a finished chuck having minimal run-out and which can be repeatedly disassembled and reassembled while retaining the as manufactured minimal run-out.

Thus it will be appreciated from the above that as a result of the present invention, a highly effective keyless chuck and method of assembly therefor is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A keyless chuck comprising:
    a jaw housing containing a plurality of jaws for controlled movement in respective guideways in response to a thrust force applied to said jaws between a retracted position and an advanced position for gripping a tool bit therebetween;
    a jaw thrust member engaging said jaws to apply a thrust force thereto; and
    a threaded member in threaded engagement with the said jaw housing and having a remote end thereof coupled to said jaw thrust member to permit relative movement therebetween, relative rotation of said jaw housing and said threaded member in a first direction applying a thrust force to said jaw thrust member to advance said jaws and relative rotation in the opposite direction applying a force to said jaw thrust member to retract said jaws;
    said remote end of said threaded member and said jaw thrust member defining a small area contact patch therebetween, the area of said contact patch less than the cross sectional area of said threaded member in plane transverse to the principal axis of said threaded member.

2. The keyless chuck of claim 1, wherein:
    said threaded member has a projection at the remote end thereof, the projection having a cross sectional area less than the cross sectional area of the threaded member;
    said jaw thrust member has a thrust body portion with a plurality of outwardly extending arms for engaging respective jaws in said jaw housing and at least two extension members aligned in the direction of said projection along a principal axis and spaced apart from one another to define a projection receiving gap therebetween; and
    means for releasably retaining said projection within its projection receiving gap.

3. The keyless chuck of claim 2, wherein said releasable retaining means comprises:
    a first diameter surface portion of said projection displaced from the remote end of said projection and a second diameter surface between the remote end of said projection and said first diameter surface, the second diameter surface larger that the first diameter surface; and
    a first and a second diameter surface defined between said spaced apart extension members, the first diameter surface smaller than the second diameter surface thereof and confronting said first diameter surface of said projection when said projection is received within the projection receiving gap.

4. The keyless chuck of claim 3, wherein said spaced apart extension members are dimensioned to yield when the second diameter surface of said projection is passed between the first diameter surfaces defined between said spaced apart extension members.

5. The keyless chuck of claim 4, wherein said jaw thrust member is fabricated from sintered powdered metal.

6. A keyless chuck comprising:
    a jaw housing containing jaw means for controlled movement in response to a thrust force applied to said jaw means between a retracted position and an advanced position for gripping a tool bit therebetween, said jaw housing having a threaded bore therein;
    a threaded member in threaded engagement with the bore and having a remote end thereof coupled to said jaw means, relative rotation of said jaw housing and said threaded member in a first direction applying a thrust force to advance said jaw means and relative rotation in the opposite direction retracting said jaw means;
    lock means for selectively locking said jaw housing from rotation relative to said threaded member, said lock means including a plurality of first teeth associated with said jaw housing and a lock plate connected to said threaded member and having a plurality of second teeth selectively engagable with said first teeth to lock said threaded member and jaw housing from relative rotation in at least one direction;
    means for resiliently biasing said lock plate and said jaw housing toward one another to engage said first teeth and said second teeth; and
    a user-operable control sleeve selectively operable to displace said lock plate from said jaw housing and disengage said first teeth from said second teeth.

7. The keyless chuck of claim 6, further comprising:
    a hollow chuck adjusting sleeve secured to said threaded member for rotation therewith and containing said lock plate for rotation therewith and for relative sliding motion therebetween.

8. The keyless chuck of claim 7, wherein said means for resiliently biasing includes spring means contained within said chuck adjusting sleeve for resiliently biasing said lock plate in the direction of said jaw housing.

9. The keyless chuck of claim 8, wherein said lock plate is formed as an annular ring having said second teeth on one side thereof, said annular ring having a plurality of radially extending tabs; and
    said chuck adjusting sleeve having a plurality of internal slots equal in number to said tabs for receiving said tabs to constrain said annular ring for rotation with said chuck adjusting sleeve.

10. The keyless chuck of claim 9, wherein said control sleeve comprises tubular portion slidably mounted on said jaw housing and having an end thereof engagable with said annular ring to displace said annular ring in response to a sliding movement of said control sleeve.

11. The keyless chuck of claim 10, further comprising:
    cam means between said control sleeve and said lock plate and operable in response to rotation of said control sleeve in a first direction to displace said lock plate from said jaw housing to disengage said first teeth and second teeth.

12. The keyless chuck of claim 11, wherein said cam means is operable in response to rotation of said sleeve in a second direction to effect engagement of said first teeth and said second teeth.

13. The keyless chuck of claim 12, wherein said cam means further comprises means to constrain said control sleeve for rotation between first and second positions.

14. The keyless chuck of claim 6, wherein said first teeth and second teeth cooperate to lock said jaw housing and threaded member from relative rotation to effect retraction of said jaw means and cooperate to effect relative rotation therebetween in response to a torque applied through the chuck to advance said jaw means.

15. The keyless chuck of claim 14, wherein said first teeth and second teeth each have a tooth profile including first and second flanks, one more steeply pitched that the other.

16. The keyless chuck of claim 6, wherein said first teeth and second teeth cooperate to lock said jaw housing and threaded member from relative rotation to effect retraction of said jaw means or relative rotation to advance said jaw means.

17. The keyless chuck of claim 16, wherein said first teeth and second teeth each have a tooth profile including first and second flanks, both flanks equally pitched.

18. The keyless chuck of claim 6, wherein said first teeth and second teeth cooperate to lock said jaw housing and threaded member from relative rotation to effect retraction of said jaw means and cooperate to effect a predetermined, limited increment of relative rotation therebetween in response to a torque applied through the chuck to advance said jaw means.

19. The keyless chuck of claim 18, wherein at least one of said first teeth and second teeth have recurring indentations of a first depth and a second depth, a tooth engaging a first indentation movable relative thereto in response to a torque applied through said chuck to a next second indentation, a tooth engaging a second indentation locked therein from movement.

20. A chuck for selectively gripping an element, which comprises:
   a jaw assembly including a first component and a second component;
   a plurality of jaws contained within the first component of the jaw assembly and movable to an element-gripping position;
   the first component of the jaw assembly having a central axis and a major surface;
   the second component of the jaw assembly having a central axis and a major surface;
   means for retaining together the first and second components with the major surfaces thereof being in a confronting relation, and
   means interposed between the major surfaces of the first and second components and formed integrally with at least a portion of the major surface of either the jaw support member or the adjusting member for facilitating the axial alignment of the central axes of the first and second components.

21. The chuck as set forth in claim 20 wherein the first component is a jaw support member and the second component is an adjusting member.

22. The chuck as set forth in claim 20 wherein the first component is a jaw housing and the second component is a jaw-guide adjusting member.

23. The chuck as set forth in claim 21, wherein the facilitating means is a deformable material which extends from the major surface of either the jaw support member or the adjusting member.

24. The chuck as set forth in claim 23, wherein the deformable material is in a selective deformed pattern necessary to facilitate the axial alignment of the axes of the jaw support member and the adjusting member.

25. The chuck as set forth in claim 24, wherein the retaining means includes a plurality of fasteners which are arranged in an asymmetrical relationship for holding together the jaw support member and the adjusting member.

26. The chuck as set forth in claim 23, wherein the deformable material includes a plurality of spaced projections extending from the major surface and wherein some projections are substantially deformed and other projections are minimally deformed.

27. The chuck as set forth in claim 21, which further comprises:
   the plurality of jaws mounted movably within the jaw support member for selectively gripping an element;
   a jaw thrust member contained within the jaw support member for applying a thrust force to the plurality of jaws;
   a threaded member in threaded engagement with the adjusting member, and
   means for rotating relatively the adjusting member on the threaded member so that the jaw thrust member moves the plurality of jaws within the jaw support member.

28. A chuck, which comprises:
   a spindle;
   a support member;
   a plurality of jaws movably contained within the support member;
   the support member mounted for rotation relative to the spindle to facilitate movement of the plurality of jaws within the support member and relative thereto;
   a lock plate having a plurality of teeth formed in one face thereof;
   means for mounting the lock plate to preclude rotational movement of the lock plate independently of the spindle;
   means coupled to the plurality of jaws and having teeth formed in one face thereof for engaging the teeth of the lock plate to prevent relative rotational movement between the lock plate and the plurality of jaws, and
   means for selectively retaining the lock plate in a position whereby the teeth of the lock plate are disengaged from the teeth of the engaging means to permit relative rotation between the spindle and the support member and thereby permit movement of the plurality of jaws relative to the support member.

29. The chuck as set forth in claim 28 wherein the retaining means includes:
   the lock plate being formed with a cam-engaging surface, and
   means formed with a cam which is engagable with the cam-engaging surface of the lock plate for moving apart the lock plate and the engaging means to separate the teeth thereof and thereby permit movement of the plurality of teeth relative to the support member.

30. A chuck, which comprises:
   a jaw support member having a central axis and a major surface;
   a plurality of jaws movably contained within the jaw support member and positionable within the support member for movement toward and into an element gripping position;
   an adjusting member having a central axis and a major surface;

means for retaining together the jaw support member and the adjusting member with the major surfaces thereof being in a confronting relation;

means interposed between the major surfaces of the jaw support member and the adjusting member for facilitating the axial alignment of the central axes of the jaw support member and the adjusting member;

means formed with a bearing surface for moving the plurality of jaws within the support member into the gripping position;

means, having a prescribed cross sectional area and formed with a bearing surface at one end thereof which is engagable with the bearing surface of the moving means, for applying a force to the moving means to move the plurality of jaws toward the gripping position, and the bearing surfaces of the moving means and the applying means being formed to engage in a small contact area which is less than the prescribed cross sectional area of the applying means to limit the internal friction of the chuck to a relatively low level during movement of the jaws within the support member.

31. A chuck, which comprises:

a jaw support member;

a plurality of jaws movably contained within the jaw support member and positionable within the support member for movement toward and into an element gripping position;

means for preventing movement of the plurality of jaws relative to the support member;

means formed with a bearing surface for moving the plurality of jaws within the support member into the gripping position;

means, having a prescribed cross sectional area and formed with a bearing surface at one end thereof which is engagable with the bearing surface of the moving means, for applying a force to the moving means to move the plurality of jaws toward the gripping position, and the bearing surfaces of the moving means and the applying means being formed to engage in a small contact area which is less than the prescribed cross sectional area of the applying means to limit the internal friction of the chuck to a relatively low level during movement of the jaws within the support member.

32. The chuck as set forth in claim 31, which further comprises:

means for selectively retaining the preventing means in a disabled position to permit movement of the plurality of jaws relative to the support member.

33. A chuck, which comprises:

a jaw support member having a central axis and a major surface;

a plurality of jaws movably contained within the jaw support member and positionable within the support member for movement toward and into an element gripping position;

an adjusting member having a central axis and a major surface;

means for retaining together the jaw support member and the adjusting member with the major surfaces thereof being in a confronting relation;

means interposed between the major surfaces of the jaw support member and the adjusting member for facilitating the axial alignment of the central axes of the jaw support member and the adjusting member;

means for preventing movement of the plurality of jaws relative to the jaw support member, means for selectively retaining the preventing means in a disabled position to permit movement of the plurality of jaws relative to the jaw support member;

means formed with a bearing surface for moving the plurality of jaws within the support member into the gripping position;

means, having a prescribed cross sectional area and formed with a bearing surface at one end thereof which is engagable with the bearing surface of the moving means, for applying a force to the moving means to move the plurality of jaws toward the gripping position, and the bearing surfaces of the moving means and the applying means being formed to engage in a small contact area which is less than the prescribed cross sectional area of the applying means to limit the internal friction of the chuck to a relatively low level during movement of the jaws within the support member.

* * * * *